(12) United States Patent
Luenberger et al.

(10) Patent No.: US 11,080,728 B1
(45) Date of Patent: Aug. 3, 2021

(54) COMPUTERIZED SYSTEMS AND METHODS FOR GROUP IDENTIFICATION AND CONTENT DELIVERY

(71) Applicant: Oath (Americas) Inc., Dulles, VA (US)

(72) Inventors: Robert Luenberger, Los Altos, CA (US); Jaime Batiz, Campbell, CA (US)

(73) Assignee: Verizon Media Inc., New York, NY (US)

(*) Notice: Subject to any disclaimer, the term of this patent is extended or adjusted under 35 U.S.C. 154(b) by 671 days.

(21) Appl. No.: 14/977,747

(22) Filed: Dec. 22, 2015

Related U.S. Application Data (60) Provisional application No. 62/095,728, filed on Dec. 22, 2014.

(51) Int. Cl.
*G06Q 30/02* (2012.01)

(52) U.S. Cl.
CPC ..... *G06Q 30/0203* (2013.01); *G06Q 30/0201* (2013.01)

(58) Field of Classification Search
None
See application file for complete search history.

(56) References Cited

U.S. PATENT DOCUMENTS

| | | | | |
|---|---|---|---|---|
| 2011/0029385 A1* | 2/2011 | Engel | ..................... | G06Q 30/02 705/14.53 |
| 2012/0233665 A1* | 9/2012 | Ranganathan | .......... | G06F 21/33 726/4 |
| 2014/0067828 A1* | 3/2014 | Archibong | .......... | H04L 65/4084 707/748 |
| 2015/0178781 A1* | 6/2015 | Luk | ..................... | G06Q 30/0267 705/14.64 |
| 2015/0339596 A1* | 11/2015 | Ioannidis | ............... | G06Q 30/02 705/5 |

* cited by examiner

*Primary Examiner* — Alan Torrico-Lopez
(74) *Attorney, Agent, or Firm* — Bookoff McAndrews, PLLC (57) ABSTRACT

Systems, methods, and computer-readable media are provided for group identification and content delivery. In accordance with one implementation, a computer-implemented method is provided that includes operations performed by at least one processor. The operations of the method include generating, based on identification data, an identification profile for each member of a set of members, the set of members being associated with a viewing group. The set of members may comprise all of the members of the viewing group or any subset of the members of the viewing group. The operations also include determining an individual score for each member of the set of members for each media file of a plurality of available media files based on the corresponding identification profile. Additionally, the operations include determining a group score for each of the plurality of available media files based on the corresponding individual score of each member.

20 Claims, 4 Drawing Sheets

COMPUTERIZED SYSTEMS AND METHODS FOR GROUP IDENTIFICATION AND CONTENT DELIVERY

CROSS-REFERENCE TO RELATED APPLICATION

This application claims the benefit of U.S. Provisional Patent Application No. 62/095,728, filed on Dec. 22, 2014. The contents of the above-referenced application are expressly incorporated herein by reference for all purposes.

TECHNICAL FIELD

The present disclosure relates to the field of electronic data processing and computerized systems and methods for group identification and content delivery over one or more networks. More particularly, and without limitation, the present disclosure relates to systems, methods, and computer readable media for identifying individuals in a group and identifying an expected group response metric for content, such as an image, video, and/or other media file.

BACKGROUND INFORMATION

Conventional television programming and content placement is based on the likely viewership for a particular program. The program and the channel on which the program airs may be used to infer the audience for the show. For example, many cartoons are interspersed with advertisements for toys and children's activities.

The advent of streaming content has given content providers additional information about the activities of a particular streaming device. For example, a streaming service may utilize the IP address of a device to determine the location of a viewer. A content provider may then select increasingly relevant advertisements or promotions for a viewer based on the viewer's location.

However, existing content selection processes do not provide, much less utilize, an identity of an audience. Further, current content targeting techniques have no way of knowing the actual type or size of the audience. Thus, incorrect inferences based on circumstantial data about an audience may result in ineffective or wasted advertising and other content placements. Additionally, content targeting that does not take into account each member of an audience may provide less than optimal ads or other content delivery.

SUMMARY

In accordance with embodiments of the present disclosure, computer-implemented systems, methods, and computer-readable media are provided for group identification and content delivery over one or more networks. Embodiments of the present disclosure also include computerized systems, methods, and computer readable media for identifying individuals in a group and scoring a group response metric for content, such as a video media file. Embodiments of the present disclosure may be implemented for targeting the delivery of content over networks, such as the Internet.

In accordance with an embodiment, a computer-implemented system is provided for selecting a media file for a viewing group. The system may include a storage device that stores instructions and at least one processor that executes the instructions. The instructions may cause the at least one processor to generate, based on identification data, an identification profile for each member of a set of members, the set of members being associated with the viewing group. The set of members may comprise all of the members of the viewing group or any subset of the members of the viewing group. The instructions may further cause the at least one processor to determine an individual score for each member of the set of members for each media file of a plurality of available media files based on the corresponding identification profile. The instructions may further cause the at least one processor to determine a group score for each of the plurality of available media files based on the corresponding individual score of each member. Additionally, or alternatively, the group score may be determined based on other information, such as non-member information (e.g., day, location, and/or content category). In addition, the instructions may also cause the at least one processor to rank the plurality of available media files based on the group scores for the available media files. The instructions may also cause the at least one processor to select a predetermined number of media files based on the ranking and present the selected media files for display.

In accordance with another embodiment, a computerized method is provided for selecting a media file for a viewing group. The method may include operations performed by at least one processor. The method may include generating, based on identification data, an identification profile for each member of a set of members, the set of members being associated with the viewing group. The set of members may comprise all of the members of the viewing group or any subset of the members of the viewing group. The method may also include determining an individual score for each member of the set of members for each media file of a plurality of available media files based on the corresponding identification profile. Additionally, the method may include determining a group score for each of the plurality of available media files based on the corresponding individual score of each member. Additionally, or alternatively, the group score may be determined based on other information, such as non-member information (e.g., day, location, and/or content category). Also, the method may include ranking the plurality of available media files based on the group scores for the available media files. The method may include selecting a predetermined number of media files based on the ranking and presenting the selected media files for display.

Computer-readable media are also provided for implementing methods of the present disclosure. Additional embodiments and related features of the present disclosure are presented herein.

BRIEF DESCRIPTION OF THE DRAWINGS

The accompanying drawings, which are incorporated in and constitute a part of this disclosure, illustrate several embodiments and aspects of the present disclosure, and together with the description, serve to explain certain principles of the presently disclosed embodiments.

DETAILED DESCRIPTION OF EXEMPLARY EMBODIMENTS

Embodiments of the present disclosure will now be described with reference to examples and the accompanying figures. The embodiments of FIGS. 1-4 are provided for purposes of illustration, and not limitation, and may be implemented together or individually.

Embodiments herein include computer-implemented methods, tangible non-transitory computer-readable mediums, and systems. The computer-implemented methods may be executed, for example, by at least one processor that is configured by instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory or storage device on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Embodiments of the present disclosure encompass systems, methods, and computer-readable media for group identification and content targeting. Such targeting may be used by streaming services and ad delivery services, for example. In accordance with certain embodiments, a system which displays a video stream includes mechanisms to identify individual members of a viewing audience. Once the system identifies individual members, reception metrics for ads or other media files are obtained for each individual viewer. The system may combine metrics of individual users to determine a group response metric (e.g., a "score") for an advertisement. Once the system determines the group score for multiple ads, the system may display the ads with the highest group score.

A show may be viewed by a group of viewers. For example, a person may watch a show with their spouse, or children may watch a show with their parent. Thus, by scoring advertisements based on the combined response to an ad for the group as a whole, advertisements may be shown with increased relevancy.

Scores may indicate the likely reception of the ad. In an embodiment, an individual score may be a response metric that represents the impact an advertisement may have on an audience member. The group score may represent the overall impact of an advertisement on a group of viewers, as a whole. For example, an advertisement may have a negative impact on one member of the audience. However, the other two members of the audience may have overwhelmingly positive reactions to the ad. Thus, the group score may reflect the cumulative effect of the ad, scoring this particular ad higher than one that generates average reactions by all three viewers.

The group score may be based on a number of factors for each member of the group. For example, the group score may weigh the score of certain members more than others. Two viewers may have opposite reactions to two different advertisements. However, one member may be more influential, have greater buying power, or be more likely to act. Thus, the group score may weigh the individual score based on these criteria. When one member is more influential, their individual score may be given more weight in the group score.

As will be appreciated from this disclosure, the group scoring systems and methods described herein may be applied to various types of content. While group scoring techniques are described with respect to selecting advertisements, group scoring may also apply to other types of media files. For example, a streaming media service may use group identification and scoring to identify potential promotions, television shows, or movie recommendations. Existing systems currently rely on a single individual's user ratings to provide recommended alternatives. However, disclosed systems may identify recommended shows, movies, and other content based on the current make-up of the audience. For example, when a user invites guests to view a movie, disclosed group identification systems may identify new audience members and update recommendations to match the current audience composition.

Accordingly, disclosed embodiments may be directed to addressing the technological challenge of gathering and processing data characterizing individuals and the current composition of an audience. Also, disclosed embodiments may improve the operation of recommendation algorithms. For example, by incorporating individual real-time user identification data from cameras and user devices (e.g., smartphones, smart watches, tablets, computers, and the like), embodiments of the present disclosure may increase processing efficiency by providing improved content recommendations, rather than providing less accurate recommendations which reduce bandwidth efficiency. For example, with less accurate recommendations, users may preview content prior to making a selection. Improved media recommendations may prevent bandwidth usage spikes and surges in server load that would otherwise occur when less effective content recommendations require services to sift through additional potential content.

Moreover, the improvements provided by disclosed embodiments may be necessarily rooted in technological developments. For example, traditional broadcast systems do not permit full-duplex communication with media presentation devices, much less the sensors and processors necessary to identify and classify individual audience members. Embodiments consistent with the present disclosure may utilize advancements in image analysis and device identification to provide higher levels of detail to classify individual audience members.

Figure 1:
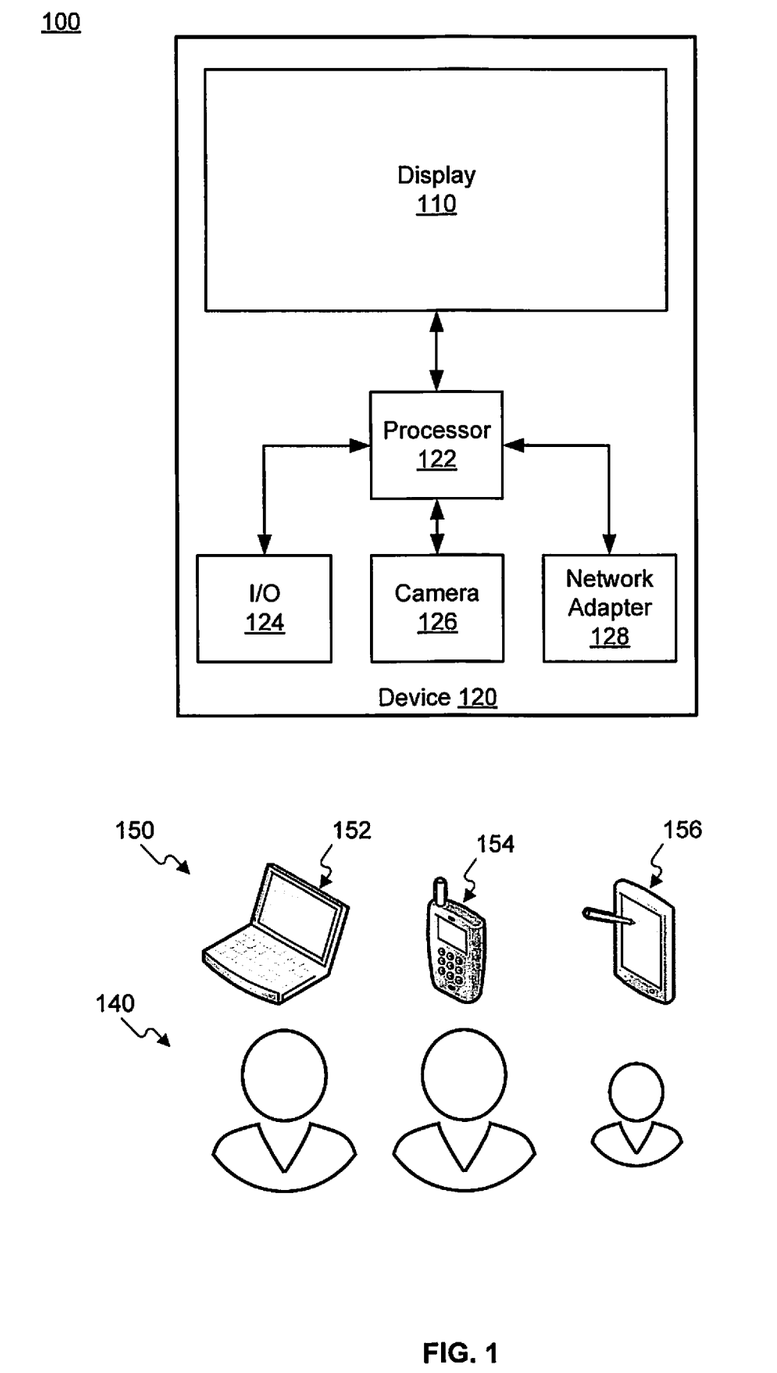
FIG. 1 illustrates an exemplary system for implementing embodiments of the present disclosure.

FIG. 1 illustrates an exemplary system 100 for implementing embodiments of the present disclosure. These functional blocks of system 100 may be implemented using any suitable combination of hardware, software, and/or firmware, such as a set of instructions and/or computer or server. The number and arrangement of components in FIG. 1 is merely provided for illustration. It will be appreciated that other arrangements and quantities of components may be provided to implement system 100. For example, functional blocks may be illustrated as all being contained in a single device. However, the functional blocks may be separate independent devices or circuits which may be connected to provide the functionality of device 120.

As shown in FIG. 1, system 100 includes device 120 and viewer devices 150. Viewers 140 may operate viewer devices 150 and view images, shows, and/or other content on device 120. Device 120 may include display 110, processor 122, input-output 124, camera 126, and network adapter 128. In some embodiments, processor 122 may control the overall operation of device 120. Processor 122 may perform functions and interact with other components of device 120 to perform desired operations. For example, processor 122 may interact with network adapter 128 and display 110 to show a video stream. Processor 122 may read and write to memory (not shown) to recall necessary data and run programs.

In some embodiments, network adaptor 128 may provide network connections. Network adaptor 128 may connect device 120 to a network (not shown), such as one or more local area networks (LAN), wide area networks (WAN), and/or one or more metropolitan area networks (MANs). Further, the network may include a combination of a variety of different network types, including Internet, Ethernet, twisted-pair, coaxial cable, fiber optic, public switched telephone network (PSTN), cellular, satellite, IEEE 802.11, terrestrial, and/or other types of network connections. In some embodiments, the network comprises the Internet.

Referring again to FIG. 1, network adaptor 128 may receive Internet traffic, such as packets from servers of video streaming services. In another example, network adaptor 128 may allow processor 122 to send and receive data from servers of, for example, advertisement serving companies.

Device 100 may display information on display 110. Processor 122 may control display 110. In an embodiment, display 110 may display video content. For example, processor 122 may request a video stream using network adapter 128. Processor 122 may transmit the video stream to display 110. In an embodiment, processor 122 may reformat or convert a video stream before transmitting the stream to display 110. For example, processor 122 may match the resolution of the video stream to a standardized resolution, such as 1080p, or determine and match the maximum resolution for display 110.

In some embodiments, display 110 may be embedded into device 120. For example, device 120 may be a smart TV or a tablet. In another embodiment, display 110 may be an external display which is connected to device 120 (not pictured). For example, display 110 may be an external monitor or a television, such as an LED, LCD, or plasma display. When external to device 120, display 110 may connect to processor 122 using a cable or wireless connection. For example, display 110 may connect to device 120 using an HDMI cable or a wireless standard. Display 110 may utilize wireless display ("WiDi") technology and/or utilize input-output 124 to connect to processor 122 (connection not shown in FIG. 1). Display 110 may be arranged or connected in additional techniques consistent with this disclosure.

In some embodiments, camera 126 may capture images and/or video. Camera 126 may provide digital image input to processor 122. For example, camera 126 may be directed at viewers 140. Camera 126 may provide images of viewers 140 to processor 122. For example, camera 126 may capture images containing viewers 140. Camera 126 may auto-focus on the faces of viewers 140. Camera 126 may include, for example, a digital camera using a complementary metal-oxide-semiconductor (CMOS), N-type metal-oxide-semiconductor (NMOS), or charge-coupled device (CCD) image sensor. Other camera devices may be used, consistent with the present disclosure.

In some embodiments, camera 126 may be integrated in device 120. Device 120 may contain a mount for camera 126. For example, camera 126 may be fixed in the bezel of display 110. In some embodiments, camera 126 may be a freestanding camera. For example, camera 126 may be a webcam that connects to processor 122 using input-output 124. Input-output 124 may utilize a USB, Ethernet, or wireless connection to receive images from camera 126 and forward the images to processor 122.

In some embodiments, processor 122 may utilize input-output (I/O) device 124 to transmit and receive data. I/O device 124 may allow processor 122 to communicate with external devices using wired or wireless connections. For example, input-output 124 may include USB ports or low-power Bluetooth connections. Input-output 124 may include additional protocols and formats to connect external devices.

In some embodiments, system 100 may include viewer devices 150. Viewer devices may include consumer electronic devices for viewing content. For example, viewer devices 150 may include laptop 152, smartphone 154, and/or tablet 146. Viewers 140 may operate viewer devices 150 during or prior to viewing display 110. For example, a person may operate tablet 156 while a television show or program stream is displayed on display 110.

In an embodiment, viewer devices 150 may communicate with device 120. Device 120 may interact with devices 150 to determine how many devices are present. For example, devices 120 may broadcast a presence request over a local network or utilize a Bluetooth connection to determine the number of devices in the proximity of device 120. Device 120 may request information from viewer devices 150. For example, viewer devices 150 may include device data such as device usage history. The device usage history may include a listing of applications that are installed on device 150, recently used applications, and the frequency of application usage. For example, device 150 may indicate that a particularly branded banking application is installed but infrequently used. In another example, device 150 may indicate that multiple cooking or recipe applications are installed and one was recently used. Additional information may be requested from device 120 and/or transmitted by devices 150, consistent with the present disclosure.

Figure 2:
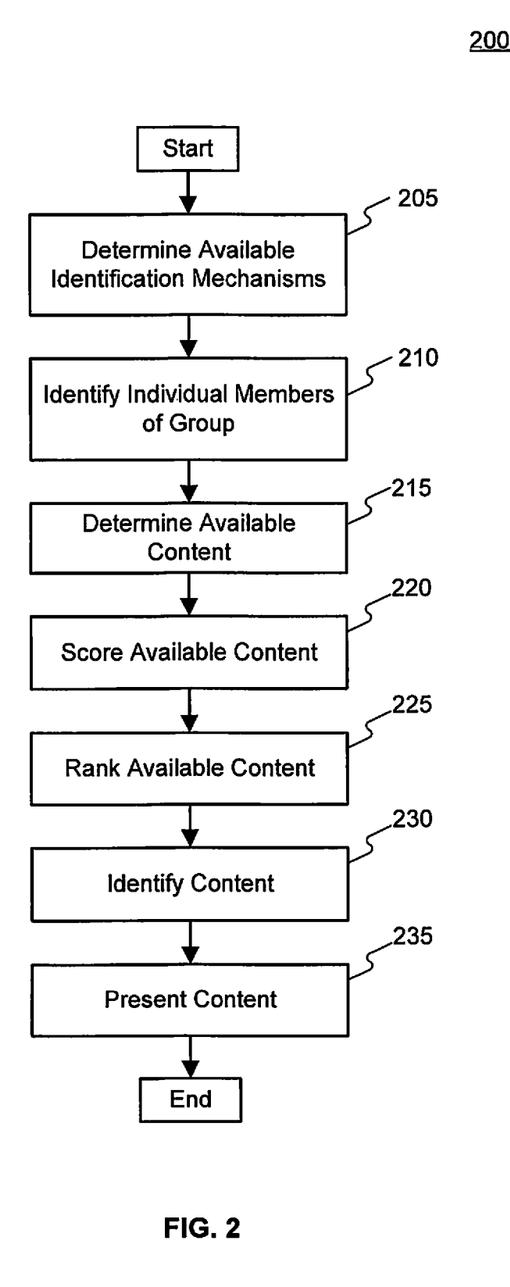
FIG. 2 illustrates a flowchart of an exemplary group identification and targeting process, consistent with embodiments of the present disclosure.

FIG. 2 illustrates a flowchart of an exemplary group identification and targeting process 200, consistent with embodiments of the present disclosure. As described below, exemplary process 200 may be implemented with one or more of the components illustrated in FIG. 1, but other arrangements and implementations are possible. In some embodiments, exemplary process 200 is implemented with one or more processors. Further, it should be understood that the steps of process 200 may be modified, combined, substituted, or performed in any order, consistent with the present disclosure. Therefore, the depicted order of steps of FIG. 2 is merely exemplary.

In step 205, processor 122 may determine which identification mechanisms or data are available. Processor 122 may determine which features are available or permitted to identify viewers 140. For example, processor 122 may determine if facial recognition and/or device data are available to identify members of viewers 140.

In an embodiment, processor 122 may determine whether camera 126 is connected and enabled. Viewers 140 may allow or disallow camera 126 from capturing images and/or audio. For example, viewers 140 may physically disconnect camera 126. Viewers 140 may block the lens of camera 126 or direct it away from viewers 140, such that camera 126 cannot capture images of viewers 140. Processor 122 may perform image analysis to determine whether viewers 140 are depicted in images captured by camera 126. In an embodiment, processor 122 may receive privacy or security settings. For example, viewers 140 may indicate that camera 126 may not be used for specific purposes, such as facial recognition or advertisement targeting. When camera 126 is unavailable or unable to capture an image of viewers 140, processor 122 may determine that facial recognition is unavailable and cannot be used as an identification mechanism.

In an embodiment, processor may determine whether I/O device 124 may identify viewer devices 150. For example, I/O device 124 may broadcast a request message to determine which devices are present and whether the device is enabled to share relevant information. Security settings on viewer devices 150 may prevent sharing device data in part or whole. For example, user preferences of viewer devices 152 may specify which types of data are permissible to share with device 120.

Processor 122 may further reference user preferences of device 120 to determine which identification mechanisms are permissible. For example, viewers 140 may specify that facial recognition is permissible. However, viewers may block communication between device 120 and viewer devices 150. Processor 122 may store these limitations in user preferences. Additional privacy, security, and control mechanisms may be used consistent with this disclosure.

In step 210, processor 122 may identify individual members of viewers 140. In an embodiment, any set or number of members of viewers 140 may be identified as part of step 210. In an embodiment, processor 122 may create identification profiles for each member of a set of identified members. Identification profiles may aggregate information for individual members. For example, identification profiles may outline necessary information to generate an individual score for an advertisement. Identification profiles may include basic information, such as demographic information (e.g., gender, age group, ethnicity). Identification profiles may include more specific information (e.g., hair color, height, weight, device application usage). In some embodiments, processor may receive audio from camera 126. Processor 122 may use voice recognition software to identify demographic information. For example, the pitch, intonation, timbre of a voice may be used to generate and/or update identification profiles. Processor 122 may also determine and use the rate at which a voice speaks. Processor 122 may store and organize additional information relevant to advertising reception metrics in individual profiles.

Processor 122 may identify individual members using available identification mechanisms or data. In an embodiment, processor may generate, populate, and update individual profiles using data from available identification mechanisms. Camera 126 and I/O device 124 may act as sources for identification data. Processor 122 may use camera identification data to determine demographic or appearance information for individual members. For example, processor 122 may utilize facial recognition algorithms to determine the gender and/or age group for individual members of viewers 140. Example facial recognition algorithms that may be implemented include principal component analysis, hidden Markov models, and the Viola-Jones Object Detection Framework. In some embodiments, processor 122 may employ commercially available software to identify people in images and certain attributes of individuals in the image (e.g., age, ethnicity, gender, mood). Processor 122 may further determine hair color and/or height based on image analysis.

In some embodiments, processor 122 may match faces to existing identification profiles. Rather than, or in addition to, analyzing images for individual attributes, processor 122 may match an image of an individual's face with an existing profile in a profile database. For example, processor 122 may determine that an image of a user's face corresponds to the face of "Profile 12345" (a profile identifier) or "Jane B. Dowersmith" (a person's name). Processor 122 may update and/or use the existing profile data when scoring content. For example, using a larger sample size of facial images over a period of time, processor 122 may determine user attributes with greater certainty. As user tastes change over time, processor 122 may update the user profile to reflect the changes, such as aging or differing reception of certain content types.

In an embodiment, processor 122 may request viewer device data from viewer devices 150 to determine information on individual members' interests or habits. For example, processor 122 may request a list of recently used applications or device usage history from viewer devices 150. In some embodiments, processor 122 may monitor device usage, such as interfacing with a wireless router to analyze packet traffic from viewer devices 150. For example, processor 122 may calculate the volume of network traffic from a viewer device, which may indicate a user's level of engagement with viewer devices 150, rather than display 110. The volume of network traffic, or real-time bandwidth utilization, may provide user activity information when packets are encrypted. In another example, processor 122 may analyze packets to determine the type of network activity (e.g., streaming content, browsing webpages, playing a game, etc.), such as through the protocols used by the packets (e.g., transmission control protocol (TCP), user datagram protocol (UDP)). Processor 122 may record interests or habits derived from device usage history or monitored device usage. For example, one of viewer devices 150 may indicate a user is interested.

In some embodiments, processor 122 may further correlate information from viewer devices 150 with information from camera 126. For example, processor may receive individual data from viewer devices 150 and camera 126. However, processor may not inherently know which device corresponds to which individual in an image. In an embodiment, processor 122 may use input-output 124 and camera 126 to determine which device corresponds to which pictured individual member. For example, processor 122 may use location detection techniques to ascertain the position of viewer devices 150 in the images produced by camera 126. Processor 122 may then determine which pictured viewer is using which viewer device. In some embodiments, processor 122 may send instructions to viewer devices to determine device locations. For example, processor 122 may send instructions to a device to light the display of the viewer device with a certain pattern. Camera 126 may record images in which the pattern appears, allowing processor 122 to identify the location of a viewer device in the images of camera 126.

In some embodiments, processor 122 may aggregate user device data separately from information from camera 126. Rather than correlating the two kinds of data for an individual user, processor 122 may maintain two sets of identification profiles. For example, processor 122 may maintain viewer device identification profiles and facial recognition identification profiles. The different types of identification profiles may be used based on the integrity of the data. For example, when facial recognition does not produce reliable results, processor 122 may use viewer device identification profiles.

In some embodiments, processor 122 may identify a set of members of viewers 140 (i.e., all or less than all viewers 140). The size and composition of the set of members may be arbitrary (e.g., chosen at random) or based on a predefined number or limit (e.g., a static number or a calculated limit to achieve a specific level of performance). Processor 122 may determine the size of the set of members based on available processing resources or an amount of available processing time. For example, viewers 140 may include a large number of viewers. Processor 122 may not be able to dedicate the resources, or have the capacity, to generate profiles for all members of viewers 140. Thus, processor may select a set of members, comprising less than all viewers 140, for which to make profiles. For example, processor 122 may select a minimum or limited number of members at random.

In an embodiment, processor 122 may select members for the set based on the certainty of the data used to generate the profile. Processor 122 may determine a certainty for each viewer without creating individual profiles. Processor 122 may select the number of members with the highest certainty for which to create individual profiles. For example, camera 126 may capture images having a clear view of six members, an obstructed view of ten members, and no clear view of four members. Processor 122 may determine that facial recognition software may identify demographic information of the six members for which camera 126 has a clear view of have the highest certainty. Thus, processor 122 may generate individual profiles for the six members that are depicted clearly in images captured by camera 126.

In step 215, processor 122 may determine available content from one or more sources. For example, to identify available ads, processor 122 may utilize network adapter 128 to communicate with an advertising server. The advertising server may transmit available advertisements to device 120. In some embodiments, network adapter 128 may automatically receive available advertisements and/or other content with streaming media.

In step 220, processor 122 may determine a score for the available content. For example, processor 122 may calculate metrics representing likely individual and group responses to available advertisements. High scoring metrics may indicate that an advertisement will be particularly relevant or have a greater effect.

Figure 3:
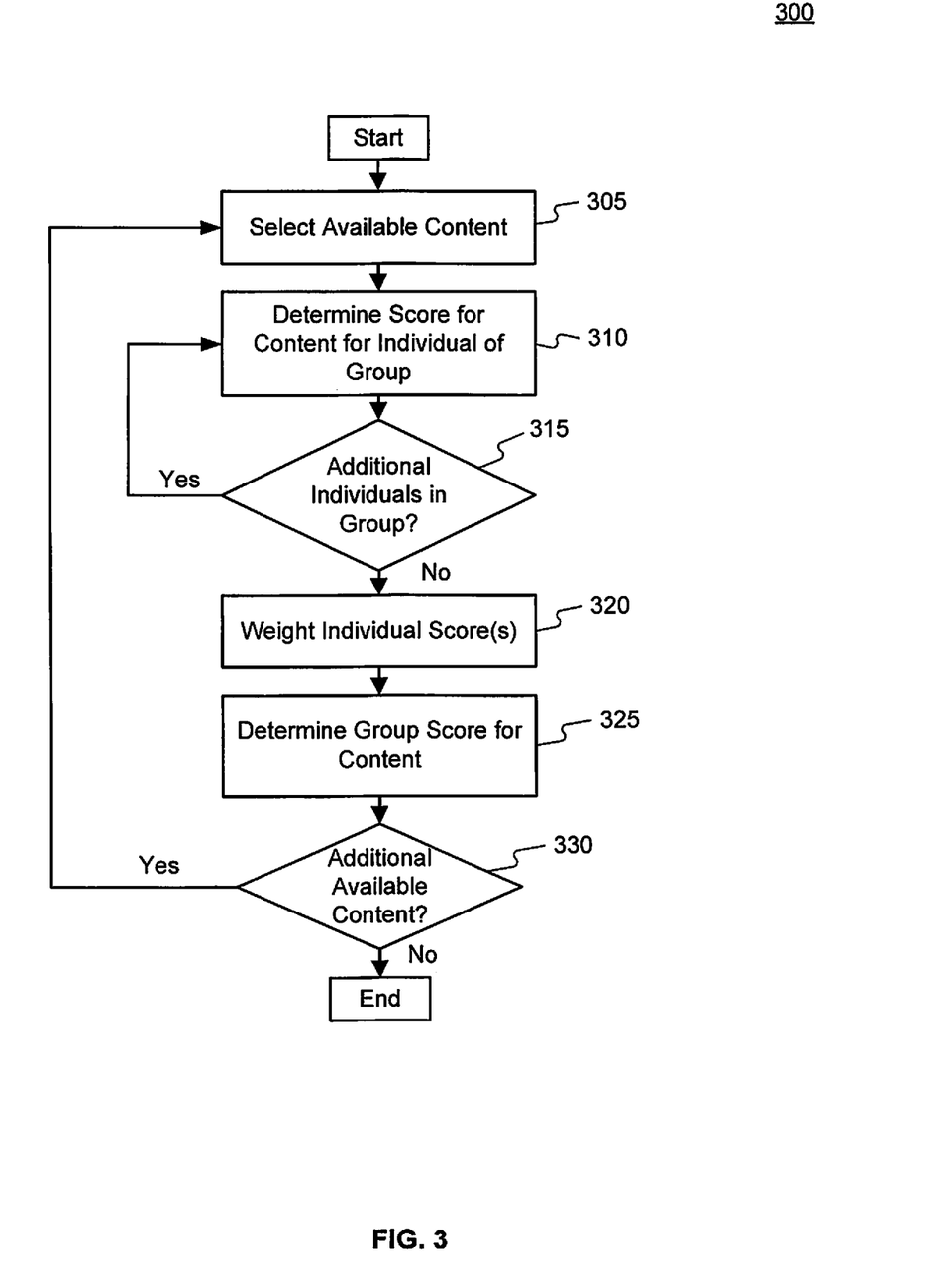
FIG. 3 illustrates a flowchart of an exemplary group scoring process, consistent with embodiments of the present disclosure.

FIG. 3 illustrates a flowchart of an exemplary group ad scoring process 300, consistent with embodiments of the present disclosure. As described below, exemplary process 300 may be implemented with one or more of the components illustrated in FIG. 1, but other arrangements and implementations are possible. In some embodiments, exemplary process 300 is implemented with one or more processors. Further, it should be understood that the steps of process 300 may be may be modified, combined, substituted, or performed in any order, consistent with the present disclosure. Therefore, the depicted order of FIG. 3 is merely exemplary.

In step 305, processor 122 may select available content, such as an available advertisement. In some embodiments, processor 122 may locally store available advertisements and determine an advertisement which has not been scored yet. The same arrangement may be applied to other forms of content as well.

In step 310, processor 122 may determine the individual scores for the available content for each member of viewers 140 or set of members comprising less than all viewers 140. Processor may determine the individual scores using a function. Processor 122 may use an identification profile to determine a score for the corresponding individual. In an embodiment, processor may determine an individual's score for an advertisement or other content based on the gender and age group of the individual. For example, if the individual is a male aged 60-65, advertisements for medicines related to prostate conditions may score high, while advertisements for candy may score low. For children, toys may score high. Individual scores may include data from devices. By way of a further example, if the device of a viewer has a number of fitness applications installed, the viewer may score high for an advertisement for athletic apparel. However, the viewer may score low for an advertisement for potato chips. Additional purchase trends may govern scoring procedures. In an embodiment, processor 122 may determine that two identification profiles are similar. Processor 122 may duplicate the score for the second similar profile rather than scoring the profile in order to reduce processing time and resources.

In an embodiment, an individual score may be weighted based on the certainty of the identification. Processor 122 may combine the individual score with a generic score based on the certainty of the individual score. The completeness of an identification profile of the reliability of the underlying data may determine the certainty of the individual score. For example, facial recognition may produce age group and gender data based on an obscure image. Processor 122 may weigh the score based on the gender and age group data less because of the uncertainty caused by the image. In some embodiments, processor 122 may determine the score for the individual use using the following formula:

$$S_{Individual} = pS_{Profile} + (1-P)S_{Generic}$$

In the formula, p represents the certain of the individual profile, $S_{Profile}$ represents the individual score based on the individual profile, and $S_{Generic}$ represents a generic score for the advertisement based on the group as a whole or non-individual factors.

In step 315, processor 122 may determine if viewers 140 includes additional members. In an embodiment, processor 122 may determine whether each member of viewers 140 has had a score calculated (step 310) for the advertisement or other content at issue. In some embodiments, processor 122 may determine that at least one member of viewers 140 has not been scored for the advertisement 140 (e.g., step 315, yes). In this case, processor may calculate a score for the advertisement for the next member of a group. In some embodiments, processor 122 may determine that an individual score has been determined for every member of viewers 140 (e.g., step 315, no). When the advertisement has an individual score for each member, processor 122 may continue to step 320. In certain embodiments, processor 122 may determine that a member of viewers 122 does not have enough information to complete an identification profile. Thus, processor 122 may determine that a score cannot be calculated for the individual and proceed to step 320 without generating an individual score.

In step 320, processor 122 may determine a weight for each of the individual scores for an advertisement or other content. In some embodiments, processor 122 may emphasize scores for certain members of viewers 140. Processor 122 may determine that the individual score for one member may be more important than other individual scores. Based on the identification profiles, processor may determine that one member of viewers 140 has higher or lower influence or buying power. For example, processor 122 may determine that the score for an adult has a greater impact than a score for a child. In some embodiments, processor 122 may also weight the group score based on certainty as discussed previously. Processor 122 may include multiple weights to determine the group score for an advertisement.

In step 325, processor 122 may determine a group score for an advertisement or other content. In an embodiment, processor 122 may calculate a response metric representative of viewers 140 as a whole for a given advertisement. Processor 122 may calculate the group score using a function, which may include the individual scores as inputs. The function may also include weights (e.g., individual weights from step 320) for the individual scores as additional inputs. For example, processor 122 may utilize function $f$ ($S_{Individual_i}, w_i$). Function $f$ may utilize various mathematical operations to determine a group score. The group score may be a numerical representation of the effectiveness of a particular advertisement for members 140. The group score may include a rating or classification, such as a finite number of potential results that may be a produce of a piecewise function. For example, function $f$ may produce results such as "high," "medium," and "low." In another example, function $f$ may produce whole numbers ranging from zero to five as a result. An example function $f$ may include the formula:

$$S_{Group} = f(S_{Individual_i}, w_i) = \frac{\sum_{i=1}^{n} w_i S_{Individual_i}}{\sum_{i=1}^{n} w_i}$$

In the formula, $w_1$ represents the weight of an individual score, $S_{Individual_i}$ represents an individual score, and $S_{Group}$ represents the group score. In an embodiment, the group score may be the average of the individual scores or the sum of the individual scores. The sum may increase the score based on the number of individual in viewers 140, which may accurately reflect the increased impact based on additional viewers. Processor 122 may determine that two advertisements are similar. Rather than calculating a group score for each advertisement, processor 122 may simply duplicate the score for the second similar advertisement.

Processor 122 may determine a group score even when a fraction of viewers 140 may be identified. For example, processor 122 may determine a group score based on based on individual profiles of a subset of members of viewers 140. In an embodiment, processor 122 may determine a group score when no single individual profile has been created (e.g., processor when processor 122 cannot identify any single individual). When no individual profiles are created or when no individual identification mechanisms are available, processor 122 may utilize default or other information to determine a group score. Such information may be predetermined, prior to calculating group scores. For example, the information may include the time of day, the current date, and/or a location of device 100. The location may be a geographic identifier (e.g., city, state, ZIP code, and/or street address) or a classification of the locale (e.g., residential, commercial, hotel, library, retail, coffee shop).

Additional information may include, for example, the IP address of device 100, an identifier of streaming content, and/or a content category.

In step 330, processor 122 determines if there are additional available advertisements or other content to score. Processor 122 may maintain a list of advertisements and their group scores. In some embodiments, processor 122 may determine that additional advertisements have not been scored (e.g., step 330, Yes). For example, processor may identify an advertisement without a group score or with an outdated group score. Processor 122 may then repeat steps 305 through 325 for the advertisement to determine a current group score. In some embodiments, processor 122 may determine that all available advertisements have been scored (e.g., step 330, No). For example, processor may determine that the list of available advertisements has no missing or dated scores. Processor 122 may end process 300 when all available advertisements have current group scores. Additional scoring processes may be used consistent with this disclosure to determine a score reflective of the response of a group of viewers as a whole.

Returning to FIG. 2, in step 225, processor 122 determines a rank for the available ads or other content. In an embodiment, the rank may be based on the group scores for the advertisements. For example, processor 122 may maintain a list of advertisements and their corresponding group scores. Processor 122 may sort or order the list of advertisements from high to low based on their group scores, such that advertisements with high group scores are listed first.

In an embodiment, the rank may be based on the priority of the advertisements. Instead of or in combination with group scores, processor 122 may rank available advertisements based on advertisement priority. For example, a company may pay for priority to show an advertisement to the most relevant audience or a high number of viewers. In order to meet the company's request for the advertisement, processor 122 may determine that even though an advertisement may have a lower group score, it should be ranked higher to meet the company's requirements. The processor may rank the available ads based on combinations and permutations of the ranking factors discussed above consistent with the disclosed embodiments.

In step 230, processor 122 may identify optimal advertisements or other content. Processor may determine that certain advertisements would be best shown to a specific group of viewers 140. In an embodiment, the optimal ads may be based on a threshold score. For example, processor may receive a lower limit group score. Processor 122 may identify advertisements having a score above the lower limit to viewers 140. In an embodiment, the optimal ads are based on a minimum rank. For example, processor 122 may identify the top ten advertisements based on the ranking of advertisements (e.g., the ranking determined in step 225). In an embodiment, the optimal ads are based on the amount to advertisement time needed. For example, a particular streaming program may specify that six minutes of advertisements should be displayed for viewers 140. Processor 122 may determine the duration of the available advertisements and identify the top ranked advertisements (e.g., the ranking of step 225) to fill in the specified advertisement time. Combinations of the disclosed identification techniques may be used consistent with the objects of this disclosure.

In step 235, processor 122 may present the optimal advertisements or other content. In an embodiment, processor 122 has preloaded available advertisements. When a break in a streaming program is reached, processor 122 may provide one of the selected advertisements to display 110. In an embodiment, processor 122 may not store available advertisements locally. Processor 122 may request streams for the selected advertisements when breaks in the streaming program are reached. Processor 122 may pre-fetch streams to reduce loading delays.

In an embodiment, processor 122 may monitor data from available identification mechanisms to determine the effectiveness of a particular advertisement or other media file(s). For example, processor 122 may monitor search queries or browser history of viewer devices 150 to determine if a URL that is displayed in an advertisement is used. Camera 126 may provide images of viewers 140 while display 110 shows advertisements. Processor 122 may use image processing techniques to determine whether viewers, as a whole or individually, were engaged by an advertisement or other media file(s). Processor 122 may update identification profiles based on advertisement reaction data.

The processes of FIGS. 2 and 3 may be performed locally by processor 122 or using a networked server. For example, the scoring and ranking may be performed by a networked server or processor 122. Identification profiles may also be generated and store locally or using a networked server. For example, network adapter 128 may transmit images from camera 126 to a networked server for image analysis. Other processes and steps may be performed locally or using a networked server, or a combination of the two consistent with this disclosure.

Figure 4:
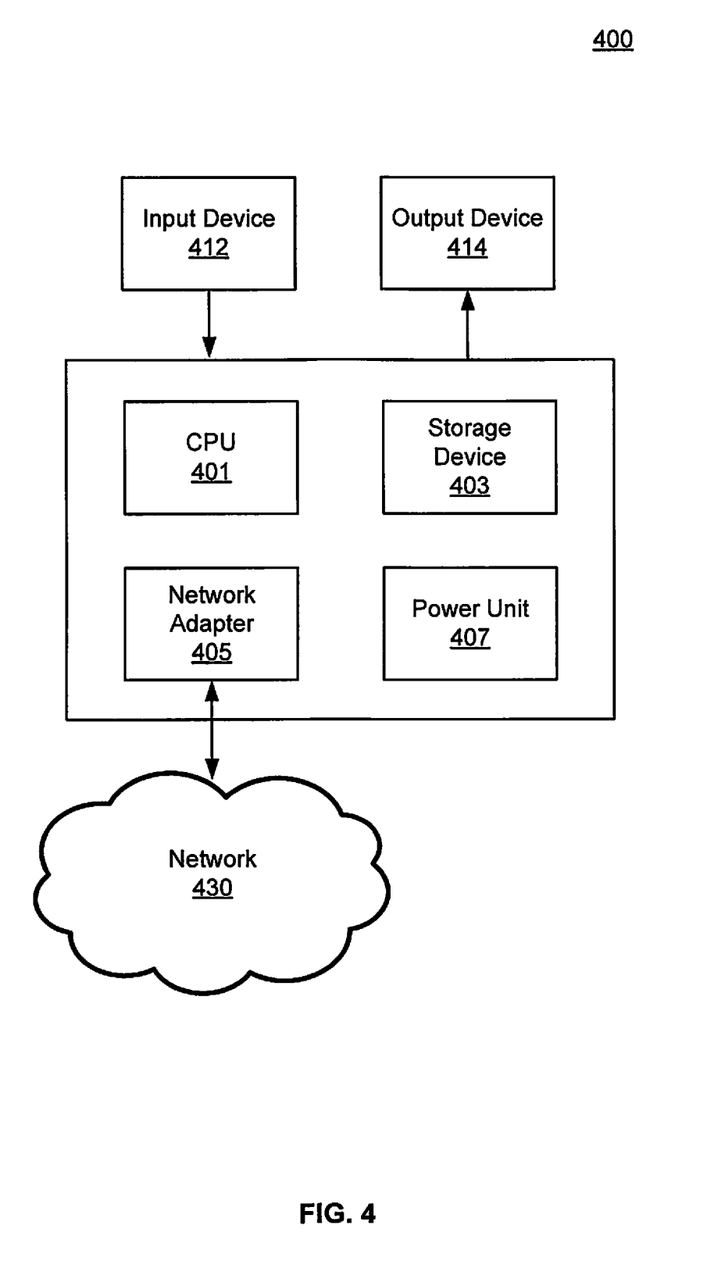
FIG. 4 illustrates an exemplary system for implementing embodiments of the present disclosure.

FIG. 4 illustrates an exemplary system 400 for implementing embodiments consistent with the present disclosure. Variations of system 400 may be used for implementing components or devices of the disclosed embodiments. It will be appreciated that the components and features represented in FIG. 4 may be duplicated, omitted, or modified. The number and arrangement of the components in FIG. 4 may also be modified.

As shown in FIG. 4, exemplary system 400 may include a central processing unit 401 (also referred to as an electronic processor or CPU) for managing and processing data, and performing operations, consistent with the present disclosure. (CPU 401 may be implemented as one or more processors.) System 400 also includes storage device 403. Storage device 403 may comprise optical, magnetic, signal, and/or any other type of storage device. System 400 may also include network adapter 405. Network adapter 405 may allow system 400 to connect to electronic networks, such as network 430. Network 430 may include, for example, the Internet, a local area network, a wide area network, a cellular network, a wireless network, or any other type of network. System 400 also includes power unit 407, which may enable system 400 and its components to receive power and operate fully.

In some embodiments, system 400 may also include input device 412, which receive input from users and/or modules, circuitry, or devices. Such modules or devices may include, but are not limited to, keyboards, mice, trackballs, trackpads, scanners, cameras, and other devices which connect via Universal Serial Bus (USB), serial, parallel, infrared, wireless, wired, or other connections. System 400 also includes output device 414, which transmit data to users and/or modules or devices. Such modules or devices may include, but are not limited to, computer monitors, televisions, screens, projectors, printers, plotters, and other recording/displaying devices which connect via wired or wireless connections.

Embodiments consistent with the present disclosure may be deployed in varying scales or modes. In some embodiments, system 100 may include household devices that may facilitate viewing groups of predetermined sizes (e.g., up to twelve individuals). For example, system 100 may be deployed in a living room and include devices such as a smart TV, user smartphones, integrated cameras, and/or a wireless LAN. In some embodiments, system 100 may be deployed on a larger scale. For example, system 100 may be deployed in a sports venue (e.g., a public stadium, ballpark, arena). System 100 may prepare individual audience profiles for audience members located in certain seating sections. System 100 may then update the displays located in, or directed at, the section to provide content that matches (e.g., scores the highest) the particular section's audience composition. In still other embodiments, various types of public displays may be used, such as LED billboards, airport displays, and elevator displays, for example.

In this disclosure, various embodiments have been described with reference to the accompanying drawings and embodiments. It will, however, be evident that various modifications and changes may be made thereto, and additional embodiments may be implemented, without departing from the present disclosure. The specification and drawings are accordingly to be regarded in an illustrative rather than restrictive sense.

For example, advantageous results may still be achieved if steps of the disclosed methods were performed in a different order and/or if components in the disclosed systems were combined in a different manner and/or replaced or supplemented by other components. Other implementations are also within the scope of the present disclosure.

It is to be understood that both the foregoing general description are exemplary and explanatory only, and are not restrictive. Further, the accompanying drawings, which are incorporated in and constitute a part of this specification, illustrate embodiments of the present disclosure and together with the description, and are similarly not restrictive.

What is claimed is:

1. A computer-implemented method for optimal selection of a media file for members of a viewing group, including:
   receiving, by a device processor, one or more media files from a server processor, wherein the one or more media files include one of video data, image data, and audio data, wherein the one or more media files include content for display on one or more viewing devices to one or more members of a viewing group;
   receiving, by the device processor, first profile information from a first viewing device of a first viewing member, wherein the first profile information includes one of first facial recognition information and first viewing device information, wherein the first facial recognition information includes image facial recognition information of the first viewing member;
   receiving, by the device processor, second profile information from a second viewing device of a second viewing member, wherein the second profile information includes one of second facial recognition information and second viewing device information, wherein the second facial recognition information includes image facial recognition information of the second viewing member, wherein the first viewing member and the second viewing member are members of the viewing group;
   generating, by the device processor, a first identification profile for the first viewing member and a second identification profile for the second viewing member;

receiving, by the device processor, a request for a video stream from at least one of the first viewing device and the second viewing device;

for each of the one or more media files, determining, by the device processor, a first score for the first viewing member and a second score for the second viewing member, wherein each of the one or more media files include one or more of video data, image data, and audio data, and wherein each of the first score and the second score is a weighted average of i) a generic score for each of the one or more media files and ii) a score based on an individual profile;

identifying a first viewing member, via facial recognition, for which an individual score has not been assigned and determining that the first viewing member has a similar identification profile as a third viewing member that has been assigned an individual score and duplicating and assigning the individual score that was assigned to the third viewing member to the first viewing member in order to reduce processing time and resources utilized by the at least one processor;

determining, by the device processor, a group score for each of the one or more media files based on the first score of the first viewing member and the second score of the second viewing member;

ranking the one or more media files based on the group score determined for each of the one or more media files;

selecting a predetermined number of media files based on the ranking;

reformatting the video stream and incorporating the selected media files into the reformatted video stream; and sending, by the device processor, instructions to at least one of the first viewing device and the second viewing device for displaying the reformatted video stream incorporating the selected media files.

2. The method of claim 1, wherein the method further includes:

determining, by the device processor, at least one of a first classification for the first viewing member based on the first viewing device and a second classification for the second viewing member based on the second viewing device.

3. The method of claim 2, further including:

determining, by the device processor, an available identification mechanism for one of the first viewing device and the second viewing device, wherein the available identification mechanism includes one of device usage and facial recognition;

wherein device usage includes determining i) a number of applications installed on one of the first viewing device and the second viewing device and a usage frequency of the installed applications on one of the first viewing device and the second viewing device; and wherein facial recognition includes determining member attributes based on one of the first facial recognition information and the second facial recognition information.

4. The method of claim 3, wherein one of the first profile information and the second profile information includes a gender and an age group of one of the first viewing and the second viewing member.

5. The method of claim 1, wherein determining one of the first score and the second score includes the equation of: $S_{individual} = pS_{Profile} + (1-p)S_{generic}$.

6. The method of claim 1, further includes determining the group score based on a weighted average of at least the first score and the second score of the members of the viewing group.

7. The method of claim 1, wherein determining the group score further includes factoring one of a geographic identifier and a media file identifier.

8. A system for optimal selection of a media file for members of a viewing group, comprising:

a storage device that stores instructions; and at least one processor that executes the instructions for:

receiving, by a device processor, one or more media files from a server processor, wherein the one or more media files include one of video data, image data, and audio data, wherein the one or more media files include content for display on one or more viewing devices to one or more members of a viewing group;

receiving, by the device processor, first profile information from a first viewing device of a first viewing member, wherein the first profile information includes one of first facial recognition information and first viewing device information, wherein the first facial recognition information includes image facial recognition information of the first viewing member;

receiving, by the device processor, second profile information from a second viewing device of a second viewing member, wherein the second profile information includes one of second facial recognition information and second viewing device information, wherein the second facial recognition information includes image facial recognition information of the second viewing member, wherein the first viewing member and the second viewing member are members of the viewing group;

generating, by the device processor, a first identification profile for the first viewing member and a second identification profile for the second viewing member;

receiving, by the device processor, a request for a video stream from at least one of the first viewing device and the second viewing device;

for each of the one or more media files, determining, by the device processor, a first score for the first viewing member and a second score for the second viewing member, wherein each of the one or more media files include one or more of video data, image data, and audio data, and wherein each of the first score and the second score is a weighted average of i) a generic score for each of the one or more media files and a score based on an individual profile;

identifying a first viewing member, via facial recognition, for which an individual score has not been assigned and determining that the first viewing member has a similar identification profile as a third viewing member that has been assigned an individual score and duplicating and assigning the individual score that was assigned to the third viewing member to the first viewing member in order to reduce processing time and resources utilized by the at least one processor;

determining, by the device processor, a group score for each of the one or more media files based on the first score of the first viewing member and the second score of the second viewing member;

ranking the one or more media files based on the group score determined for each of the one or more media files;

selecting a predetermined number of media files based on the ranking;

reformatting the video stream and incorporating the selected media files into the reformatted video stream; and sending, by the device processor, instructions to at least one of the first viewing device and the second viewing device for displaying the reformatted video stream incorporating the selected media files.

9. The system of claim 8, wherein the system further includes:

determining, by the device processor, at least one of a first classification for the first viewing member based on the first viewing device and a second classification for the second viewing member based on the second viewing device.

10. The system of claim 9, further including:

determining, by the device processor, an available identification mechanism for one of the first viewing device and the second viewing device, wherein the available identification mechanism includes one of device usage and facial recognition;

wherein device usage includes determining i) a number of applications installed on one of the first viewing device and the second viewing device and a usage frequency of the installed applications on one of the first viewing device and the second viewing device; and wherein facial recognition includes determining member attributes based on one of the first facial recognition information and the second facial recognition information.

11. The system of claim 10, wherein one of the first profile information and the second profile information includes a gender and an age group of one of the first viewing and the second viewing member.

12. The system of claim 8, wherein determining one of the first score and the second score includes the equation of: Srndvidual=pSProfile+(1−p)Sgeneric.

13. The system of claim 8, further includes determining the group score based on a weighted average of at least the first score and the second score of the members of the viewing group.

14. The system of claim 13, wherein determining the group score further includes factoring one of a geographic identifier and a media file identifier.

15. A computer-readable medium storing instructions, the instructions configured to cause at least one processor to perform operations including:

receiving, by a device processor, one or more media files from a server processor, wherein the one or more media files include one of video data, image data, and audio data, wherein the one or more media files include content for display on one or more viewing devices to one or more members of a viewing group;

receiving, by the device processor, first profile information from a first viewing device of a first viewing member, wherein the first profile information includes one of first facial recognition information and first viewing device information, wherein the first facial recognition information includes image facial recognition information of the first viewing member;

receiving, by the device processor, second profile information from a second viewing device of a second viewing member, wherein the second profile information includes one of second facial recognition information and second viewing device information, wherein the second facial recognition information includes image facial recognition information of the second viewing member, wherein the first viewing member and the second viewing member are members of the viewing group;

generating, by the device processor, a first identification profile for the first viewing member and a second identification profile for the second viewing member;

receiving, by the device processor, a request for a video stream from at least one of the first viewing device and the second viewing device;

for each of the one or more media files, determining, by the device processor, a first score for the first viewing member and a second score for the second viewing member, wherein each of the one or more media files include one or more of video data, image data, and audio data, and wherein each of the first score and the second score is a weighted average of i) a generic score for each of the one or more media files and a score based on an individual profile;

identifying a first viewing member, via facial recognition, for which an individual score has not been assigned and determining that the first viewing member has a similar identification profile as a third viewing member that has been assigned an individual score and duplicating and assigning the individual score that was assigned to the third viewing member to the first viewing member in order to reduce processing time and resources utilized by the at least one processor;

determining, by the device processor, a group score for each of the one or more media files based on the first score of the first viewing member and the second score of the second viewing member;

ranking the one or more media files based on the group score determined for each of the one or more media files;

selecting a predetermined number of media files based on the ranking;

reformatting the video stream and incorporating the selected media files into the reformatted video stream; and sending, by the device processor, instructions to at least one of the first viewing device and the second viewing device for displaying the reformatted video stream incorporating the selected media files.

16. The computer-readable medium of claim 15, wherein the operations further comprise:

determining, by the device processor, at least one of a first classification for the first viewing member based on the first viewing device and a second classification for the second viewing member based on the second viewing device.

17. The computer-readable medium of claim 16, the operations further comprising:

determining, by the device processor, an available identification mechanism for one of the first viewing device and the second viewing device, wherein the available identification mechanism includes one of device usage and facial recognition;

wherein device usage includes determining i) a number of applications installed on one of the first viewing device and the second viewing device and ii) a usage frequency of the installed applications on one of the first viewing device and the second viewing device; and wherein facial recognition includes determining member attributes based on one of the first facial recognition information and the second facial recognition information.

18. The computer-readable medium of claim 17, wherein one of the first profile information and the second profile information includes a gender and an age group of one of the first viewing and the second viewing member.

19. The computer-readable medium of claim 15, wherein determining one of the first score and the second score includes the equation of: Srndvidual=pSProfile+(1−p)Sgeneric.

20. The computer-readable medium of claim 15, wherein determining the group score further includes factoring one of a geographic identifier and a media file identifier.

* * * * *